(12) United States Patent
Kam et al.

(10) Patent No.: US 8,498,330 B2
(45) Date of Patent: Jul. 30, 2013

(54) METHOD AND APPARATUS FOR CODING MODE SELECTION

(75) Inventors: Yan Ho Kam, Kowloon (HK); Wan Chi Siu, New Territories (HK); Yui Lam Chan, Kowloon (HK); Wai Lam Hui, New Territories (HK); Wai Hong Wong, Quarry Bay (HK); Ka Man Cheng, Kowloon (HK); Yan Huo, Shenzhen (CN)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 564 days.

(21) Appl. No.: 12/493,785

(22) Filed: Jun. 29, 2009

(65) Prior Publication Data

US 2010/0329341 A1    Dec. 30, 2010

(51) Int. Cl.
*H04N 11/02* (2006.01)

(52) U.S. Cl.
USPC .................. 375/240; 375/240.02; 375/240.18

(58) Field of Classification Search
USPC .................. 375/240.02–240.18; 382/236–238
See application file for complete search history.

(56) References Cited

U.S. PATENT DOCUMENTS

| | | | |
|---|---|---|---|
| 6,798,837 B1 * | 9/2004 | Uenoyama et al. | 375/240.16 |
| 8,213,515 B2 * | 7/2012 | Kudana et al. | 375/240.17 |
| 2006/0153299 A1 * | 7/2006 | Iwata et al. | 375/240.16 |
| 2006/0193385 A1 * | 8/2006 | Yin et al. | 375/240.12 |
| 2007/0086523 A1 | 4/2007 | Yan | |
| 2007/0121728 A1 * | 5/2007 | Wang et al. | 375/240.18 |
| 2007/0140353 A1 | 6/2007 | Sun | |
| 2008/0002770 A1 | 1/2008 | Ugur et al. | |
| 2008/0008242 A1 * | 1/2008 | Lu et al. | 375/240.16 |
| 2009/0010337 A1 * | 1/2009 | Wang | 375/240.16 |
| 2009/0086814 A1 * | 4/2009 | Leontaris et al. | 375/240.02 |
| 2009/0180539 A1 * | 7/2009 | Kudana et al. | 375/240.15 |
| 2009/0238271 A1 * | 9/2009 | Kim et al. | 375/240.12 |
| 2011/0129013 A1 * | 6/2011 | Chen et al. | 375/240.02 |
| 2011/0211640 A1 * | 9/2011 | Kim et al. | 375/240.16 |

* cited by examiner

*Primary Examiner* — William C Vaughn, Jr.
*Assistant Examiner* — Luis M Perez
(74) *Attorney, Agent, or Firm* — Ella Cheong Hong Kong; Margaret A. Burke; Sam T. Yip

(57) ABSTRACT

Method and apparatus for providing a fast and accurate video coding process are disclosed. After checking the coding history of certain coded video frame units of a video, the order of the inter prediction and the intra prediction is adaptively exchanged for each coding video frame unit of an inter frame. Furthermore, the computations for coding modes in the latter part of the computation order are selectively skipped so as to speed up the coding process without degrading the video quality.

16 Claims, 4 Drawing Sheets

METHOD AND APPARATUS FOR CODING MODE SELECTION

TECHNICAL FIELD

The claimed invention relates generally to image/video signal processing. In particular, the claimed invention relates to method and apparatus for video coding and particularly video compression.

SUMMARY OF THE INVENTION

During video coding, using video compression as an example, a video encoder converts raw video data into a compressed bit-stream. The compressed bit-stream is either stored in a storage medium or transmitted to a video decoder via a channel. A video decoder reconstructs the video data from the compressed bit-stream. Owing to data loss during the conversion process, the quality of reconstructed video data is often poorer than that of the original video data.

Raw video data are video frames in a video and video frames are classified into inter frames and intra frames. Each video frame is divided into non-overlapping macroblocks which are basic video frame units for video coding.

There are different coding methods, for example, intra frame prediction and inter frame prediction. Inter prediction refers to those coding methods which exploit the temporal redundancies among video frames while intra prediction refers to those coding methods which exploit the spatial redundancies within each video frame. For every encoding method, either intra prediction or inter prediction, different coding modes are available for selection, and in different coding modes, each macroblock is partitioned into different sizes of smaller blocks. Those coding modes regarding inter prediction are also known as inter modes. Those coding modes regarding intra prediction are also known as intra modes.

As many choices of coding modes for encoding a macroblock are available, it is desirable to get the best coding mode. The process is known as mode selection. Prior to the claimed invention, an exhaustive approach was often used for mode selection. The exhaustive approach carries out a corresponding motion searching or an intra prediction for each candidate coding mode, calculating a cost for each candidate mode and then choosing the coding mode with the lowest cost. In the exhaustive approach, usually, the inter prediction is performed for inter modes first, and then the intra prediction is performed for intra modes.

In some cases, it is found that the cost of the best inter mode is very low after completing computations for inter modes, and it is so low that it is unlikely there is an intra mode capable to match with. Some fast approaches in U.S. patent publications such as 2008/0112481, 2008/0002770 and 2007/0086523 were suggested for speeding up mode selection by introducing a condition checking after completing the inter prediction to check whether the intra prediction should be performed. The condition checking can be done by comparing the cost of the best inter mode with a threshold value. If the cost of the best inter mode is smaller than the threshold value, the intra prediction is skipped. Although the approach as proposed can improve the encoding speed to some extent, the approach only considers the unworthiness of performing the intra prediction, so the approach overlooks the unworthiness of performing the inter prediction. In case the intra prediction is conducted prior to the inter prediction, the worthiness of conducting inter prediction can be determined to see if inter prediction is required, however, the same problem of overlooking the worthiness of performing the intra prediction exists.

An objective of the claimed invention is to check the coding information such as the coding mode types of certain coded adjacent macroblocks of the current macroblock which is under processing to decide the order of performing the inter prediction and the intra prediction for the current macroblock of a video frame.

If the majority of the coded adjacent macroblocks have adopted a particular mode, the current macroblock adopts the same mode. Therefore, the order of performing the inter and intra predictions is adaptive and changeable to fit different macroblocks rather than a fixed arrangement. If the inter prediction is performed first, the remaining counterpart which is performed is the intra prediction. If the intra prediction is performed first, the remaining counterpart which is performed is the inter prediction.

Furthermore, according to the order as determined, either inter prediction or intra prediction is performed first, and after that, the remaining counterpart can be skipped if the cost of the best inter/intra mode is smaller than a threshold value. By skipping the whole process of performing the counterpart, many ineffectual computations are saved. This results in a large reduction in processing time, and the lesser the computations are required, the lesser the power consumption will be.

Other aspects of the claimed invention are also disclosed.

BRIEF DESCRIPTION OF THE DRAWINGS

These and other objects, aspects and embodiments of the claimed invention will be described hereinafter in more details with reference to the following drawings, in which:

DETAILED DESCRIPTION OF THE INVENTION

Figure 1:
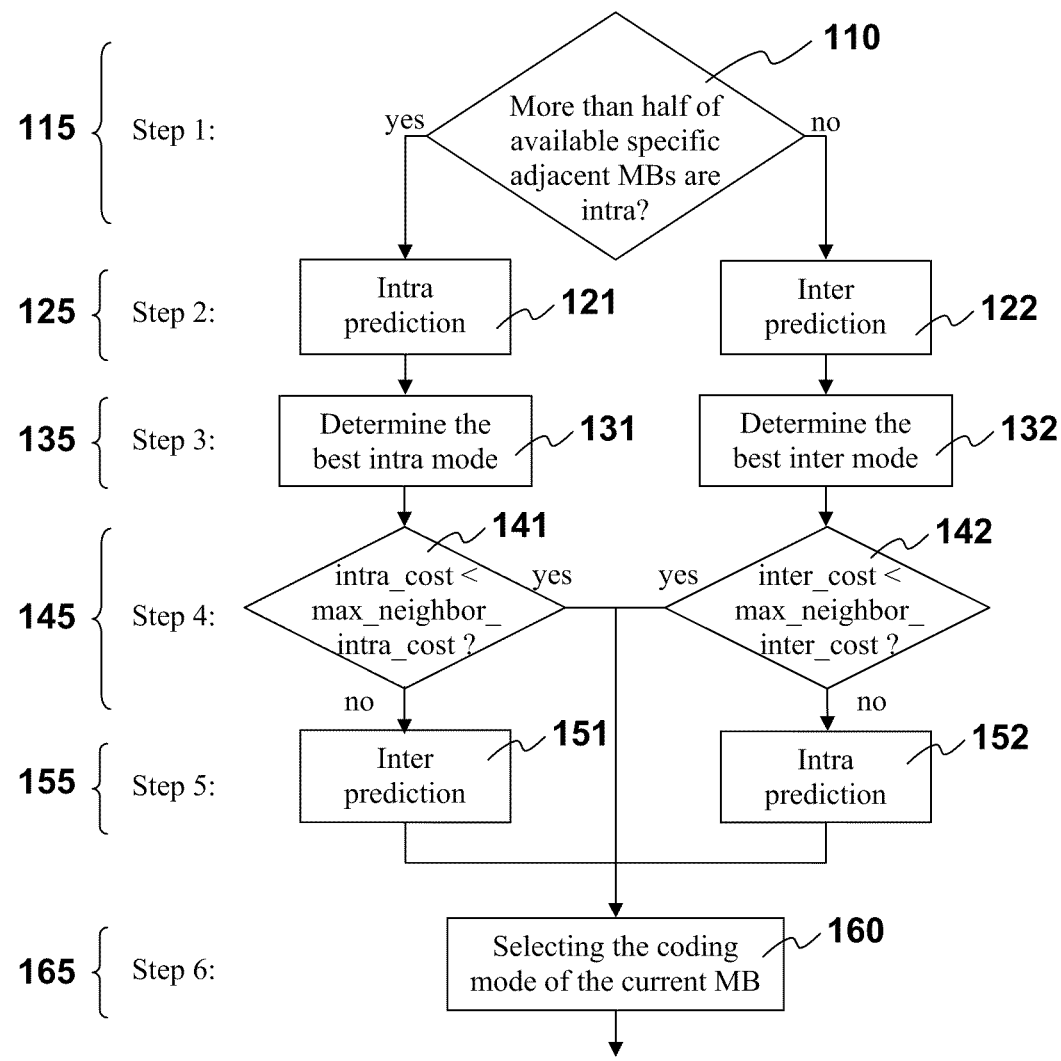
FIG. 1 shows a flow chart of how mode selection is performed in a preferred embodiment.

FIG. 1 shows a flow chart of how mode selection is performed in a preferred embodiment. A video is a sequence of video frames. Each video frame is divided into a number of non-overlapping macroblocks (MBs). Each macroblock (MB) is to be processed and one of the possible order of processing is a raster scan. The raster scan allows macroblocks along the same row to be processed from left to right before macroblocks along the subsequent row which is underneath of the current macroblock is processed.

When a macroblock is being processed, for example, being coded, the process of mode selection is carried out to determine which inter mode or intra mode is appropriate for the current macroblock. In another embodiment, it can be a sub-macroblock or a block of one or more pixels which are being processed and the pixels which are being processed are known as the current coding video frame unit as a whole. The process starts by checking the coding history of one or more specific coded adjacent macroblocks of the current macroblock in a checking step 110. The coding history of a macroblock includes many types of data including coding modes, motion vectors, cost values, sum-of-absolute-difference (SAD), sum-of-squared-difference (SSD), mean-of-absolute-difference (MAD), mean-of-squared-difference (MAD) and sum-of-absolute-transformed-difference (SATD). In checking step 110, coding modes is checked to determine whether the macroblock is intra coded or inter coded.

If more than half of specific coded adjacent macroblocks available were intra coded, it is very likely that the best coding mode of the current macroblock is also an intra mode. In this case, the intra prediction is performed prior to the inter prediction. After completing the intra prediction in a first intra prediction step 121, the best intra mode is determined in an intra mode determining step 131. A full search is an exemplary approach to determine the best intra mode, and the best intra mode is the one with the minimum cost.

In order to decide whether the inter prediction should be skipped, the cost value of the best intra mode (intra_cost) determined in the first intra prediction step 121 is compared with a first threshold value (max_neighbor_intra_cost) in a first comparing step 141. If the cost value of the best intra mode is smaller than the first threshold value, the inter prediction is skipped, and the best intra mode is chosen as the actual coding mode of the current macroblock in a selecting step 160. By skipping the inter prediction, many ineffectual computations are saved. If the cost value of the best intra mode is larger than or equal to the first threshold value, the inter prediction is not skipped, and the inter prediction is performed in a second inter prediction step 151. Subsequently, the cost value of the best intra mode is compared with the cost value of the best inter mode to select the one with a lower cost to be the actual coding mode of the current macroblock in the selecting step 160. The first threshold value mentioned in this embodiment is the maximum value amongst cost values of available specific coded adjacent macroblocks which were intra coded.

It is also possible to define the first threshold value, in other embodiments, as a fixed value, or the minimum value, average value, weighted average value, median value or weighted median value amongst cost values of available specific coded adjacent macroblocks which were intra coded or all available specific coded adjacent macroblocks.

If it is found in the checking step 110 that half or more of available specific macroblocks were not intra coded, the best coding mode of the current macroblock is likely to be an inter mode. In this case, the inter prediction is performed prior to the intra prediction. After completing the inter prediction in a first inter prediction step 122, the best inter mode is determined in an inter mode determining step 132. A full search is an exemplary approach to determine the best inter mode, and the best inter mode is the one with the minimum cost.

In order to decide whether the intra prediction should be skipped, the cost value of the best inter mode (inter_cost) determined in the first inter prediction step 122 is compared with a second threshold value (max_neighbor_inter_cost) in a second comparing step 142. If the cost value of the best inter mode is smaller than the second threshold value, the intra prediction is skipped, and the best inter mode is chosen as the actual coding mode of the current macroblock in a selecting step 160. By skipping the intra prediction, many ineffectual computations are saved. If the cost value of the best inter mode is larger than or equal to the second threshold value, the intra prediction is not skipped, and the intra prediction is performed in a second intra prediction step 152. Subsequently, the cost value of the best inter mode is compared with the cost value of the best intra mode to select the one with a lower cost to be the actual coding mode of the current macro block in the selecting step 160. The second threshold value used in this embodiment is the maximum value amongst cost values of available specific coded adjacent macroblocks which were inter coded.

In another embodiment, a first motion prediction step (Step 2 125) can include the first intra prediction step 121 and the first inter prediction step 122 so that after the checking step 110 (Step 1 115), either the first intra prediction step 121 or the first inter prediction step 122 is performed in the first motion prediction step. In a best motion prediction mode determining step (Step 3 135), if the first motion prediction step is a first intra prediction step 121, then an intra mode determining step 131 is performed; or else if the first motion prediction step is a first inter prediction step 122, then an inter mode determining step 132 is performed. In a comparing step (Step 4 145), the performance of the best motion prediction mode obtained from the best motion prediction mode determining step is compared with a threshold value to determine a second motion prediction step (Step 5 155). The comparing step determines to omit second motion prediction step if the performance of the best motion prediction mode from the best motion prediction mode determining step is better than the performance in neighboring coded macroblock, and the best motion prediction mode is selected as the coding mode for the current macroblock in the selecting step 160 (Step 6 165). If the performance of the best motion prediction mode is not as good as the performance in neighboring coded macroblock, a second motion prediction step is performed. The second motion prediction step can include the second inter prediction step 151 and the second intra prediction step 152. If the first motion prediction step is a first intra prediction step 121, then the second motion prediction step is a second inter prediction step 151. If the first motion prediction step is a first inter prediction step 122, the second motion prediction step is a second intra prediction step 152. After the second motion prediction step is performed, the coding mode of the current marcoblock is determined in the selecting step 160 after comparing the results from the first motion prediction step with the second motion prediction step to see which one is more cost-efficient.

It is also possible to define the second threshold value, in other embodiments, as a fixed value, or the minimum value, average value, weighted average value, median value or weighted median value amongst cost values of available specific coded adjacent macroblocks which were intra coded or all available specific coded adjacent macroblocks.

Figure 2A:
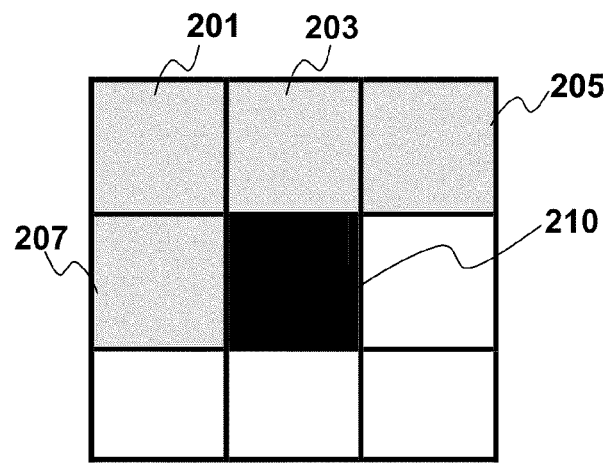
FIG. 2A shows the specific coded adjacent macroblocks of a macroblock.

FIG. 2A shows one or more specific coded adjacent macroblocks of a macroblock. The current macroblock 210 is the macroblock being processed. The coding history of surrounding macroblocks is taken into consideration and they are known as specific coded adjacent macroblocks. Specific coded adjacent macroblocks includes macroblocks on the top 203 (in the same column as the macroblock 210 and in a preceding row of the current macroblock 210), the top-right 205 (in a subsequent column of the current macroblock 210 and in a preceding row of the current macroblock 210), and the left 207 (in a preceding column of the current macroblock 210 and in the same row of the current macroblock 210) of the current macroblocks.

In an exemplary case that the current macroblock is located along the right edge of a video frame, the top-right macroblock 205 is not available. Then, the top-left macroblock 201 is used instead.

Figure 2B:
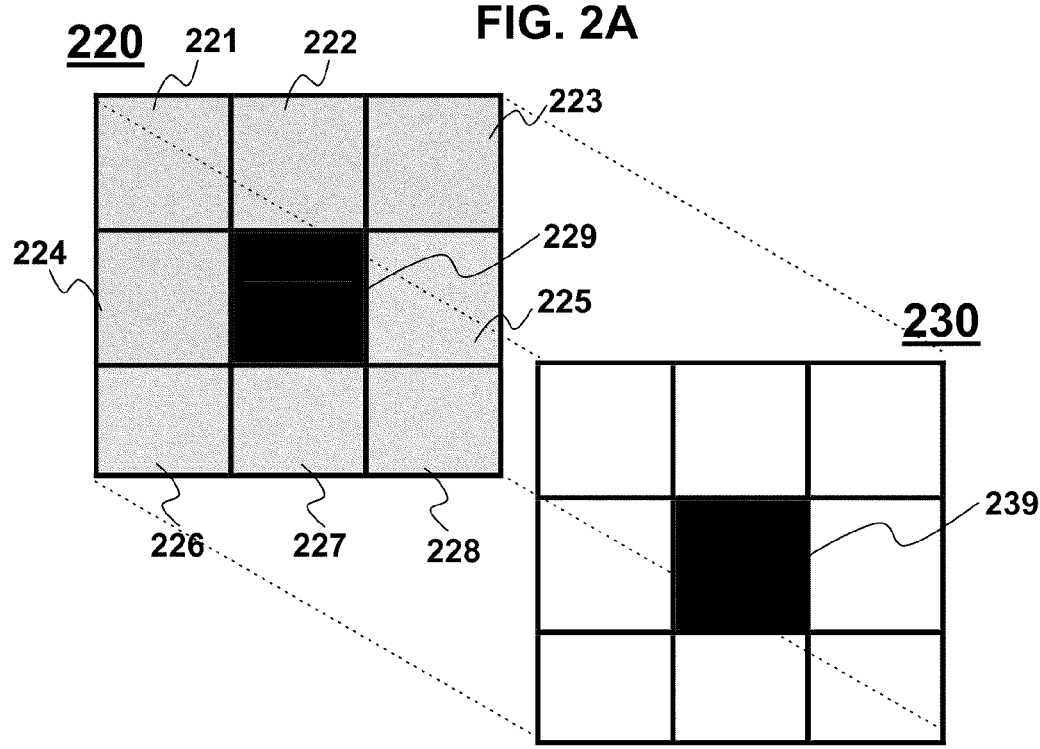
FIG. 2B shows a macroblock in a video frame and its corresponding macroblock in a reference video frame.

FIG. 2B shows a macroblock in a video frame and its corresponding macroblock in a reference video frame 220. Other embodiments may also make use of macroblocks of other frames such as the collocated macroblock 229 of the reference frame 220 which has the same position relative to the video frame as the current macroblock 239. Alternatively, the eight macroblocks 221, 222, 223, 224, 225, 226, 227 and 228 surrounding the collocated macroblock 229 are used.

Figure 3:
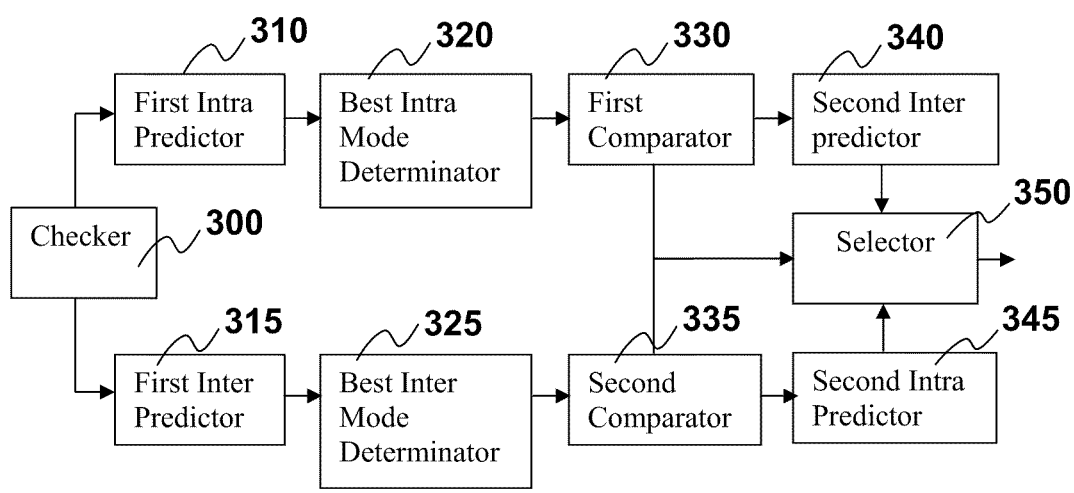
FIG. 3 shows a block diagram of an apparatus for mode selection.

FIG. 3 shows a block diagram of an apparatus for mode selection. In an embodiment, the apparatus is a processor or a module in a processor, and each block represents a separate unit or all the blocks are integrated into a single module. A checker 300 checks the coding history of one of specific coded adjacent macroblocks of the current macroblock which is being processed. The coding history of a macroblock includes many types of data including coding modes, motion vectors, cost values, sum-of-absolute-difference (SAD), sum-of-squared-difference (SSD), mean-of-absolute-difference (SATD), mean-of-squared-difference (MSD) and sum-of-absolute-transformed-difference (SATD). The checker 300 checks the coding modes in the coding history to determine whether the macroblock is intra coded or inter coded.

If more than half of specific coded adjacent macroblocks available were intra coded, it is very likely that the best coding mode of the current macroblock (not shown) is also an intra mode. In this case, the intra prediction is performed prior to the inter prediction. The first intra predictor 310 performs intra prediction for the current macroblock. The results are provided to a best intra mode determinator 320 to determine the best intra mode. The best intra mode determinator 320 compares the results to determine which intra mode has the lowest cost. The intra mode with the lowest cost is determined to be the best intra mode.

In order to decide whether the inter prediction should be skipped, a first comparator 330 compares the cost value of the best intra mode (intra_cost) determined by the first intra predictor 310 and a first threshold value (max_neighbor_intra_cost). If the cost value of the best intra mode is smaller than the first threshold value, the inter prediction is skipped, and a selector 350 chooses the best intra mode to be the actual coding mode of the current macroblock (not shown). By skipping the inter prediction, the ineffectual computations in relation to the inter prediction are saved. If the cost value of the best intra mode is larger than or equal to the first threshold value, the inter prediction is not skipped, and a second inter predictor 340 performs the inter prediction. Subsequently, the selector 350 compares the cost value of the best intra mode with the cost value of the best inter mode to select the one with a lower cost to be the actual coding mode of the current macro block. The first threshold value mentioned in this embodiment is the maximum value amongst cost values of available specific coded adjacent macroblocks which were intra coded.

It is also possible to define the first threshold value, in other embodiments, as a fixed value, or the minimum value, average value, weighted average value, median value or weighted median value amongst cost values of available specific coded adjacent macroblocks which were intra coded or all available specific coded adjacent macroblocks.

If half or more of specific coded adjacent macroblocks available were inter coded, it is very likely that the best coding mode of the current macroblock is also an inter mode. In this case, the inter prediction is performed prior to the intra prediction. The first inter predictor 315 performs inter prediction for the current macroblock. The results are provided to a best inter mode determinator 325 to determine the best inter mode. The best inter mode determinator 325 compares the results to determine which inter mode has the lowest cost. The inter mode with the lowest cost is determined to be the best inter mode.

In order to decide whether the intra prediction should be skipped, a second comparator 335 compares the cost value of the best inter mode (inter_cost) determined by the first inter predictor 315 and a second threshold value (max_neighbor_inter_cost). If the cost value of the best inter mode is smaller than the second threshold value, the intra prediction is skipped, and a selector 350 chooses the best inter mode to be the actual coding mode of the current macroblock. By skipping the intra prediction, many ineffectual computations are saved. If the cost value of the best inter mode is larger than or equal to the second threshold value, the intra prediction is not skipped, and a second intra predictor 345 performs the intra prediction. Subsequently, the selector 350 compares the cost value of the best inter mode with the cost value of the best intra mode to select the one with a lower cost to be the actual coding mode of the current macroblock. The second threshold value mentioned in this embodiment is the maximum value amongst cost values of available specific coded adjacent macroblocks which were inter coded. Then the selector 350 outputs the selected coding mode to an encoder (not shown) for processing the current macroblock.

It is also possible to define the second threshold value, in other embodiments, as a fixed value, or the minimum value, average value, weighted average value, median value or weighted median value amongst cost values of available specific coded adjacent macroblocks which were inter coded or all available specific coded adjacent macroblocks.

The specific coded adjacent macroblocks are the neighboring macroblocks of the current macroblock according to the description regarding FIG. 2A and FIG. 2B.

Figure 4:
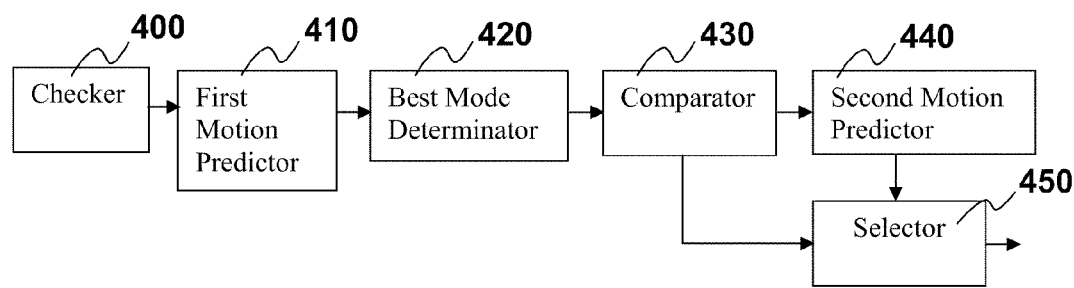
FIG. 4 shows another embodiment of an apparatus for mode selection.

FIG. 4 shows another embodiment of an apparatus for mode selection. In another embodiment, the first intra predictor and the first inter predictor are integrated into a first motion predictor 410 which perform either intra prediction or inter prediction according to the output from the checker 400. The best intra mode determinator and the best intra mode determinator are also integrated into one best mode determinator 420 to determine the best inter mode if the inputs from the first motion predictor 410 are inter mode results and determine the best intra mode if the inputs from the first motion predictor 410 are intra modes results. The first comparator is integrated with the second comparator into a comparator 430 which compares the output of the best mode determinator 420 with a threshold value. Furthermore, the second inter predictor and the second intra predictor are integrated into a second predictor 440 which may be skipped according to the result from the comparator 430. A selector 450 selects the mode for the current coding video frame units according to the output of the comparator 430 or the output of the second predictor 440. The selector 450 performs the same functions as the selector does in FIG. 3.

The description of preferred embodiments of the claimed invention are not exhaustive and any update or modifications to them are obvious to those skilled in the art, and therefore reference is made to the appending claims for determining the scope of the claimed invention.

INDUSTRIAL APPLICABILITY

The claimed invention has industrial applicability in consumer electronics, in particular with video applications. The claimed invention can be used in the video encoder, and in particular, in a multi-standard video encoder. The multi-standard video encoder implements various standards such as H.263, H.263+, H.263++, H264, MPEG-1, MPEG-2, MPEG-4, AVS (Audio Video Standard) and the like. More particularly, the claimed invention is implemented in an embodiment for a DSP (digital signal processing) video encoder. The claimed invention is used not only for software implementation but also for hardware implementation. For example, the claimed invention is implemented in a chip such as Xilinx FPGA chip or SoC ASIC chip.

What is claimed is:

1. A method of video coding mode selection, comprising:
retrieving, by a processor, coding history of one or more specific coded video frame units;
determining, by the processor, whether a first motion prediction to be performed on a current coding video frame unit being with either an inter prediction or an intra prediction according to the retrieved coding history;
performing, by the processor, the first motion prediction on the current coding video frame unit;
determining, by the processor, a best inter prediction mode among one or more possible inter prediction modes for said first motion prediction if the first motion prediction being performed with an inter prediction, or a best intra prediction mode among one or more possible intra prediction modes for said first motion prediction if the first motion prediction being performed with an intra prediction;
comparing, by the processor, the performance of said best inter prediction mode if the first motion prediction being performed with an inter prediction or said best intra prediction mode if the first motion prediction being performed with an intra prediction with a threshold value to determine whether to bypass a second motion prediction; wherein if the second motion prediction is not bypassed, the second motion prediction to be performed with an inter prediction if the first motion prediction being an intra prediction; otherwise with an intra prediction.

2. The method as claimed in claim 1, wherein said first motion prediction is to be performed with an intra prediction if more than half of the specific coded video frame units being intra coded.

3. The method as claimed in claim 1, wherein said first motion prediction is to be performed with an inter prediction if more than half of the specific coded video frame units being inter coded.

4. The method as claimed in claim 1, wherein said coding history including: coding mode, motion vectors, cost value, sum-of-absolute-difference (SAD), sum-of-squared-difference (SSD), mean-of-absolute-difference (MAD), mean-of-squared-difference (MSD), and sum-of-absolute-transformed-difference (SATD) of each specific coded video frame unit.

5. The method as claimed in claim 1, wherein said one or more specific coded video frame units are selected from:
a coded video frame unit which is adjacent to the current coding video frame unit,
a coded video frame unit which is on top of the current coding video frame unit,
a coded video frame unit which is on left of the current coding video frame unit,
a coded video frame unit which is on top-left of the current coding video frame unit, or
a coded video frame unit which is on top-right of the current coding video frame unit.

6. The method as claimed in claim 1, wherein said one or more specific coded video frame units are selected from:
a coded video frame unit in a coded video frame with a position same as the current coding video frame unit,
a coded video frame unit in a coded video frame with a position on top of the current coding video frame unit,
a coded video frame unit in a coded video frame with a position on left of the current coding video frame unit,
a coded video frame unit in a coded video frame with a position on right of the current coding video frame unit,
a coded video frame unit in a coded video frame with a position on top-left of the current coding video frame unit,
a coded video frame unit in a coded video frame with a position on top-right of the current coding video frame unit,
a coded video frame unit in a coded video frame with a position on bottom of the current coding video frame unit,
a coded video frame unit in a coded video frame with a position on bottom-left of the current coding video frame unit, or
a coded video frame unit in a coded video frame with a position on bottom-right of the current coding video frame unit.

7. The method as claimed in claim 1, wherein said threshold value is a fixed value predefined for the current video frame.

8. The method as claimed in claim 1, wherein said threshold value is selected from: a maximum value, a minimum value, an average value, a median value, a weighted average value, or a weighted median value of the one or more specific coded video frame units.

9. An apparatus for video coding mode selection, comprising:
a first motion predictor;
a checker for checking coding history of one or more specific coded video frame units to determine whether the first motion predictor is to perform either an inter prediction or an intra prediction on a current coding video frame unit;
a selector for selecting a best inter prediction mode among one or more possible inter prediction modes for the first motion predictor in performing the inter prediction if the first motion predictor is to perform an inter prediction, or a best intra prediction mode among one or more possible intra prediction modes for the first motion predictor in performing the intra prediction if the first motion prediction is to perform an intra prediction;
a second motion predictor;
a comparator for comparing output of the first motion predictor with a threshold value to decide whether to bypass the second motion predictor; wherein if the second motion predictor is not bypassed, the second motion predictor is to perform an inter prediction if the first motion predictor performed an intra prediction; otherwise the second motion predictor is to perform an intra prediction.

10. The apparatus as claimed in claim 9, wherein the first motion predictor performs an inter prediction if more than half of the specific coded video frame units are inter mode.

11. The apparatus as claimed in claim 9, wherein the first motion predictor performs an intra prediction if more than half of the specific coded video frame units are intra mode.

12. The apparatus as claimed in claim 11, wherein said coding history including: coding mode, motion vectors, cost value, sum-of-absolute-difference (SAD), sum-of-squared-difference (SSD), mean-of-absolute-difference (MAD), mean-of-squared-difference (MSD) and sum-of-absolute-transformed-difference (SATD) of each specific coded video frame unit.

13. The apparatus as claimed in claim 9, wherein said one or more specific coded video frame units are selected from:
a coded video frame unit which is adjacent to the current coding video frame unit, a coded video frame unit which is on top of the current coding video frame unit,
a coded video frame unit which is on left of the current coding video frame unit,
a coded video frame unit which is on top-left of the current coding video frame unit, or
a coded video frame unit which is on top-right of the current coding video frame unit.

14. The apparatus as claimed in claim 9, wherein said one or more specific coded video frame units are selected from a group consisting of:
a coded video frame unit in a coded video frame with a position same as the current coding video frame unit,
a coded video frame unit in a coded video frame with a position on top of the current coding video frame unit,
a coded video frame unit in a coded video frame with a position on left of the current coding video frame unit,
a coded video frame unit in a coded video frame with a position on right of the current coding video frame unit,
a coded video frame unit in a coded video frame with a position on top-left of the current coding video frame unit,
a coded video frame unit in a coded video frame with a position on top-right of the current coding video frame unit,
a coded video frame unit in a coded video frame with a position on bottom of the current coding video frame unit,
a coded video frame unit in a coded video frame with a position on bottom-left of the current coding video frame unit, or
a coded video frame unit in a coded video frame with a position on bottom-right of the current coding video frame unit.

15. The apparatus as claimed in claim 9, wherein said threshold value is a fixed value predefined for the current video frame.

16. The apparatus as claimed in claim 9, wherein said threshold value is selected from: a maximum value, a minimum value, an average value, a median value, a weighted average value, or a weighted median value of the one or more specific coded video frame units.

* * * * *